T. HARRISON & W. C. BUCHANAN.
GRAIN SEPARATOR.
No. 188,050.  Patented March 6, 1877.
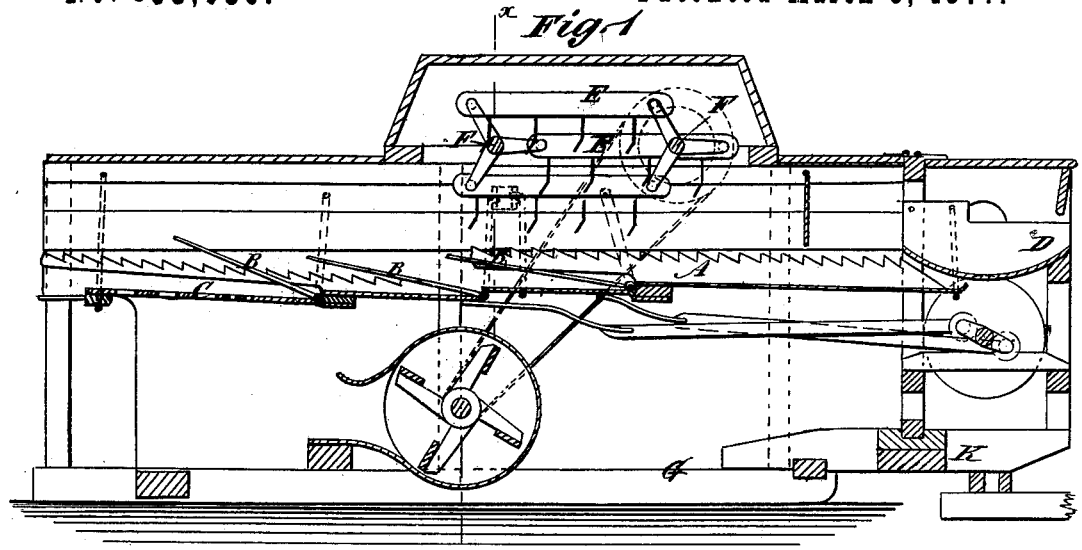
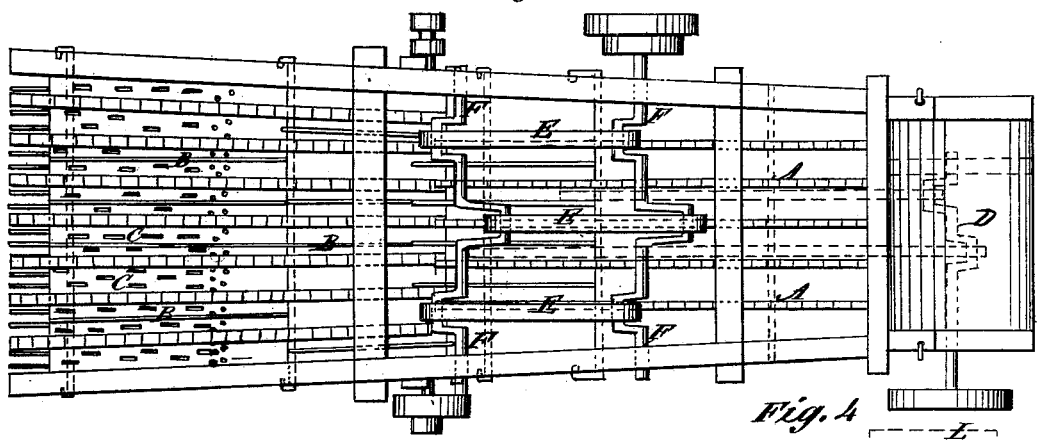
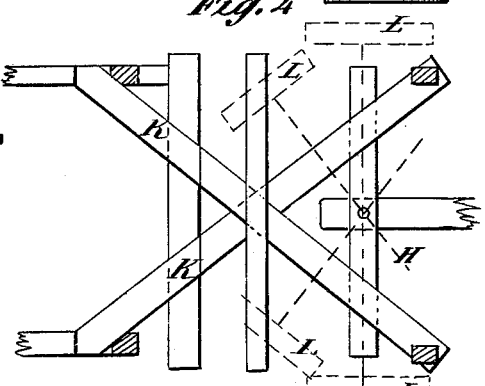
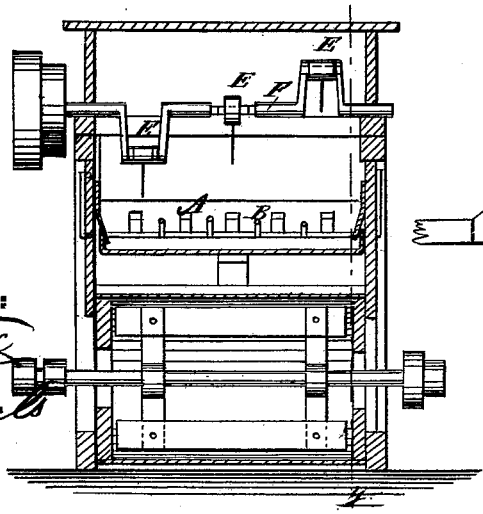
WITNESSES:
INVENTOR:
ATTORNEYS.

UNITED STATES PATENT OFFICE.

THEOPHILUS HARRISON AND WILLIAM C. BUCHANAN, OF BELLEVILLE, ILL.

IMPROVEMENT IN GRAIN-SEPARATORS.

Specification forming part of Letters Patent No. 188,050, dated March 6, 1877; application filed May 22, 1876.

*To all whom it may concern:*

Be it known that we, THEOPHILUS HARRISON and WILLIAM C. BUCHANAN, of Belleville, in the county of St. Clair and State of Illinois, have invented an Improvement in Thrashing-Machine Cleaners, of which the following is a specification:

Figure 1 of the drawing is a longitudinal sectional elevation; Fig. 2, a top view with cover off. Fig. 3 is a transverse section; Fig. 4, a plan view of frame.

From thrashers the straw comes to the separator from six inches to three feet in depth, and the shaking packs the straw, so that it requires to be pulled apart by some instrumentality. We accomplish this by rakes mounted on crank-shafts, so that they are alternately oscillated and carried forward over the straw, then down into it and back with it, thus pulling apart the straw at the point of juncture of the sections of the shaker, so as greatly to facilitate the escape of the grain.

A and C represent the successive oppositely-reciprocated sections of a straw-shaker, and B the agitators or lifting-fingers operating in connection therewith.

The thrashed straw and grain are delivered from the thrasher at D. We propose to combine with the sections of the shaker, at the point of juncture, the rakes E, for the purpose of pulling apart the straw at the point where it is most liable to pack. The rakes E are mounted on crank-shafts F, so that by the rotation of shafts the rakes are caused to loosen up the straw. The cranks are set at such an angle to each other as to make the rakes work in succession at regular intervals. G represents the base-sills of the machine, which are especially intended as an improvement upon a shaking-separator, in successive sections, having opposite simultaneous vibrating motion, and with shaking, lifting fingers, the fingers overlapping the joint between the sections.

In such a machine there is a tendency in the straw to pack at the overlap or point of juncture of the two sections in the center of the machine. By placing our pickers or rakes immediately over this point we overcome the difficulty.

What we claim as new is—

The combination, with a straw-shaker made in sections, vibrating from one crank-shaft in opposite directions, and provided with lifting-fingers working under the straw, of the picker-rakes, placed over the shaker at the junction of its sections, and working over the straw, as and for the purpose specified.

THEOPHILUS HARRISON.
WILLIAM C. BUCHANAN.

Witnesses:
CYRUS THOMPSON,
HUGH W. HARRISON.